United States Patent [19]
Eichinger

[11] 3,933,217
[45] Jan. 20, 1976

[54] DRIVE GEAR SYSTEM FOR MOTOR VEHICLES

[75] Inventor: Johann Eichinger, Putzbrunn, Germany

[73] Assignee: Carl Hurth, Maschinen- und Zahnradfabrik, Munich, Germany

[22] Filed: Mar. 29, 1974

[21] Appl. No.: 456,255

[30] Foreign Application Priority Data
Apr. 4, 1973 Germany............................ 2316932
May 4, 1973 Germany.......................... 23226075

[52] U.S. Cl............. 180/70 R; 180/43 B; 180/65 F; 188/18 A
[51] Int. Cl.²......................................... B60K 17/04
[58] Field of Search............... 180/70 R, 65 F, 43 B; 280/96.1; 188/18 A

[56] References Cited
UNITED STATES PATENTS

| | | | |
|---|---|---|---|
| 716,065 | 12/1902 | Ledwinka........................... | 180/65 F |
| 2,258,328 | 10/1941 | Lee et al. ........................ | 180/65 F X |
| 3,387,502 | 6/1968 | Tourneau ....................... | 180/65 F X |
| 3,583,511 | 6/1971 | Asberg........................... | 188/18 A X |
| 3,608,661 | 9/1971 | Arnot............................... | 180/65 F |
| 3,737,000 | 6/1973 | Knobloch et al.................. | 180/43 B |
| 3,749,415 | 7/1973 | Sampatacos....................... | 280/96.1 |
| 3,758,129 | 9/1973 | Ishikawa........................ | 188/18 A X |

*Primary Examiner*—M. Henson Wood, Jr.
*Assistant Examiner*—John P. Silverstrim
*Attorney, Agent, or Firm*—Woodhams, Blanchard and Flynn

[57] ABSTRACT

Drive gear system for motor vehicles. The invention is particularly applicable to driving means such as planetary gearing for connecting multiple electric motors respectively to individual wheels of such vehicle. Recognizing that differing demands are made upon various parts of such mechanism, such as the braking disk, the wheel rim supporting disk and other component parts of the drive system, it is expensive and inconvenient to make the entire unit of material capable of meeting the most severe conditions imposed upon any part thereof. Accordingly, there is here provided a construction by which the braking disk, the wheel rim supporting disk, ring gear, supporting housing and other component parts may all be made as units separate from each other and therefore made as desired of materials appropriate to their respective functions. Further, the braking disk and support structure therefor are excepting for a small centering land mounted in a manner to be spaced from adjacent components whereby to minimize heat transfer and resulting distortion.

8 Claims, 4 Drawing Figures

DRIVE GEAR SYSTEM FOR MOTOR VEHICLES

FIELD OF THE INVENTION

The invention relates to a drive gear system for motor vehicles, particularly electric vehicles, having a planetary gearing to be installed in a hub member, wherein the sun pinion is arranged coaxially with the drive shaft for the planetary gearing, such as the output shaft of an electric motor, the planet pinion or pinions is or are supported as an intermediate gear or gears around a stationary axis and an internally toothed annular gear is provided on a rotating hub member which carries the rim and wherein the hub member carries a brake disk.

BACKGROUND OF THE INVENTION

In known hub members, the internally toothed annular gear and the brake disk are formed of one piece which has the disadvantage that these parts influence one another, as a result of heat development therein and the resulting warpage. Also the entire member must be made of a material appropriate for the most highly stressed part.

The basic purpose of the invention is to overcome these deficiencies, namely to produce a device of the type described above, in which hub member, annular gear and/or brake disk have little or no influence on one another with respect to heat generation and resulting warpage. A further purpose is to diminish material costs.

The basic purpose of the invention is attained by means of a device characterized in that the rotating hub member includes an annular gear and/or a brake disk consisting of at least two components made from different materials. When the annular gear is made of material of a high quality, the hub member is releasably connected thereto. In one development of the invention the teeth of the annular gear are arranged on further annular means which are radially spaced from the hub member other than for the presence of a supporting land whereby to provide a barrier against the transfer of heat from one component to the other and further to prevent the distortion resulting therefrom. On the other hand, it may be advantageous as an alternative or as an addition to separate the brake disk from the remaining device. In this respect the heat development on the brake disk and the radiation of same must be carefully controlled. In this connection it may be desirable to mount the brake disk releasably onto the hub member and for this purpose it will be advantageous if the brake disk also is arranged on an annular support which is excepting for a supporting land arranged in radially spaced relationship to the hub member. In mounting the brake disk it will be advantageous if said brake disk or its annular support is provided with a flange which serves to secure the rim onto the hub member. From the standpoint of installation and service, it will be desirable to locate such mounting flange externally of the apparatus for easy access.

In order to assure a good installation of the device, the invention is further so developed that the brake disk is separate from the hub member and the brake disk is provided with means for securing the rim. The invention may be advantageously still further developed by making the member which is provided with the teeth of the annular gear separate from the hub member, which construction is of special advantage in that the member which carries the teeth of the annular gear can consist of different material from that of the hub member. In this way, the teeth of the annular gear can be constructed of a material which can carry the desired high stress, while the remaining parts, substantially the hub and the brake disk, can be made of a material more appropriate to the function of these parts. The invention has a special meaning for electric vehicles in which for each wheel which must be driven one motor is provided to which advantageously the axle is flanged.

Further advantages and characteristics of the invention can be taken from the following description.

The invention will be described in connection with exemplary embodiments which are illustrated in FIGS. 1 to 4.

DETAILED DESCRIPTION

Figure 1:
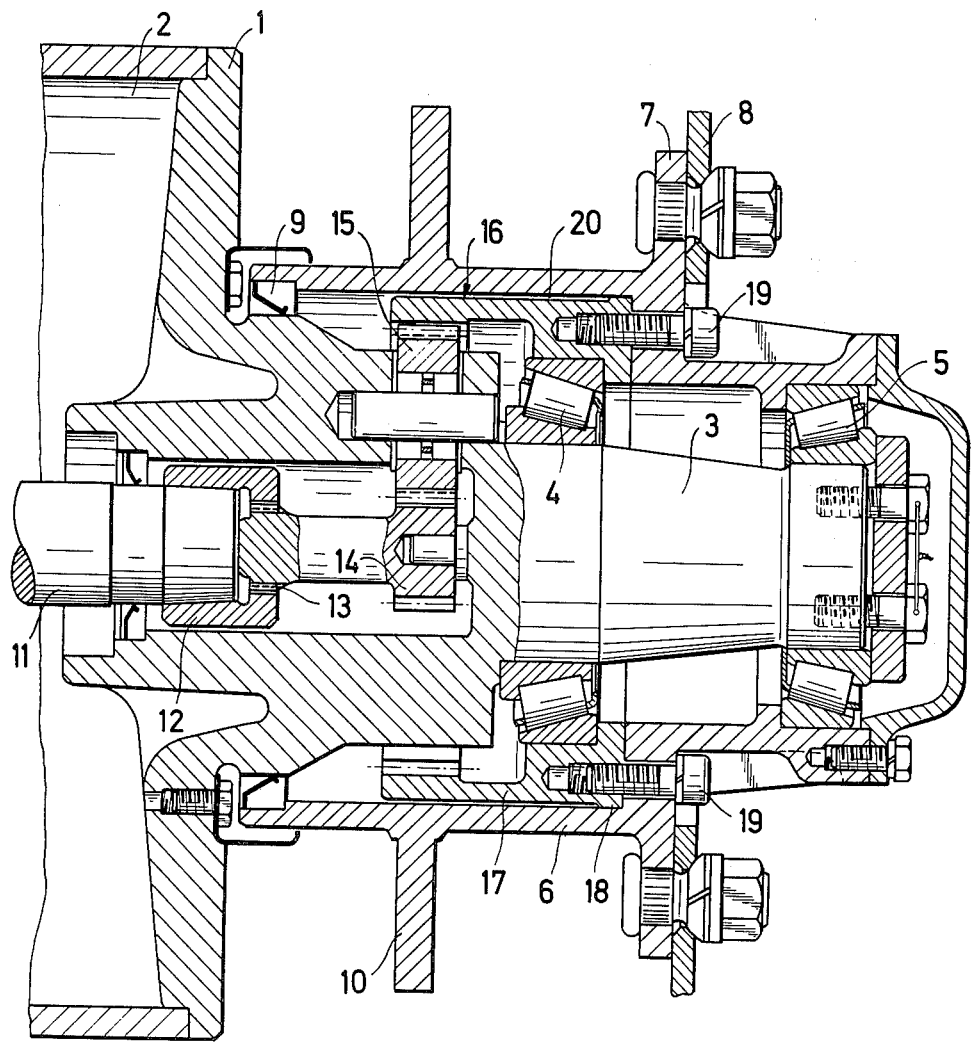
FIG. 1 illustrates an exemplary embodiment of the invention having an internally toothed annular gear.

The bearing plate 1 (FIG. 1) of an electric motor 2, (not further illustrated), is carried by an axle 3 which through roller bearings 4, 5 carries a hub member 6. Said hub member is provided on the side remote the electric motor with a flange 7 on which a rim 8 can be secured by conventional means. The hub member and the axle, or the bearing plate, are sealed with respect to each other by a gasket 9 of the known type. The oil filling and the associated elements like filler neck, drain plug, oil gauge are not illustrated because these are known. The hub member 6 is provided with a brake disk 10 which is integral with the hub member.

A sun pinion 14 is coaxially connected to the output shaft 11 of the electric motor by means of a coupling 12 and coupling teeth 13. The sun pinion meshes with a plurality of planet pinions 15 which are arranged in a star-shaped manner around the sun pinion. The sun pinion is thus supported in and by the teeth of the planet pinions which in turn are supported on the axle, or the bearing plate, by means of appropriate pins. For this purpose the axle, or the bearing plate, is provided with suitable recesses. The planet pinions mesh on their external sides with an internally toothed annular gear 16 whose teeth are arranged at the end of a cylindrical sleeve 17. On the end remote from the teeth the cylindrical sleeve terminates in a flange 18 with which the annular gear is centered in the hub member and is fastened in place by screws 19. The outside diameter of the cylindrical sleeve is dimensioned to provide a radial spacing 20 thereof from the hub member. Thus the hub member and annular gear do not influence each other as a result of heat generation and resulting distortion. It is also possible to make the hub member and annular gear of different material and the treating of the internal teeth is simpler and less subject to error.

Figure 2:
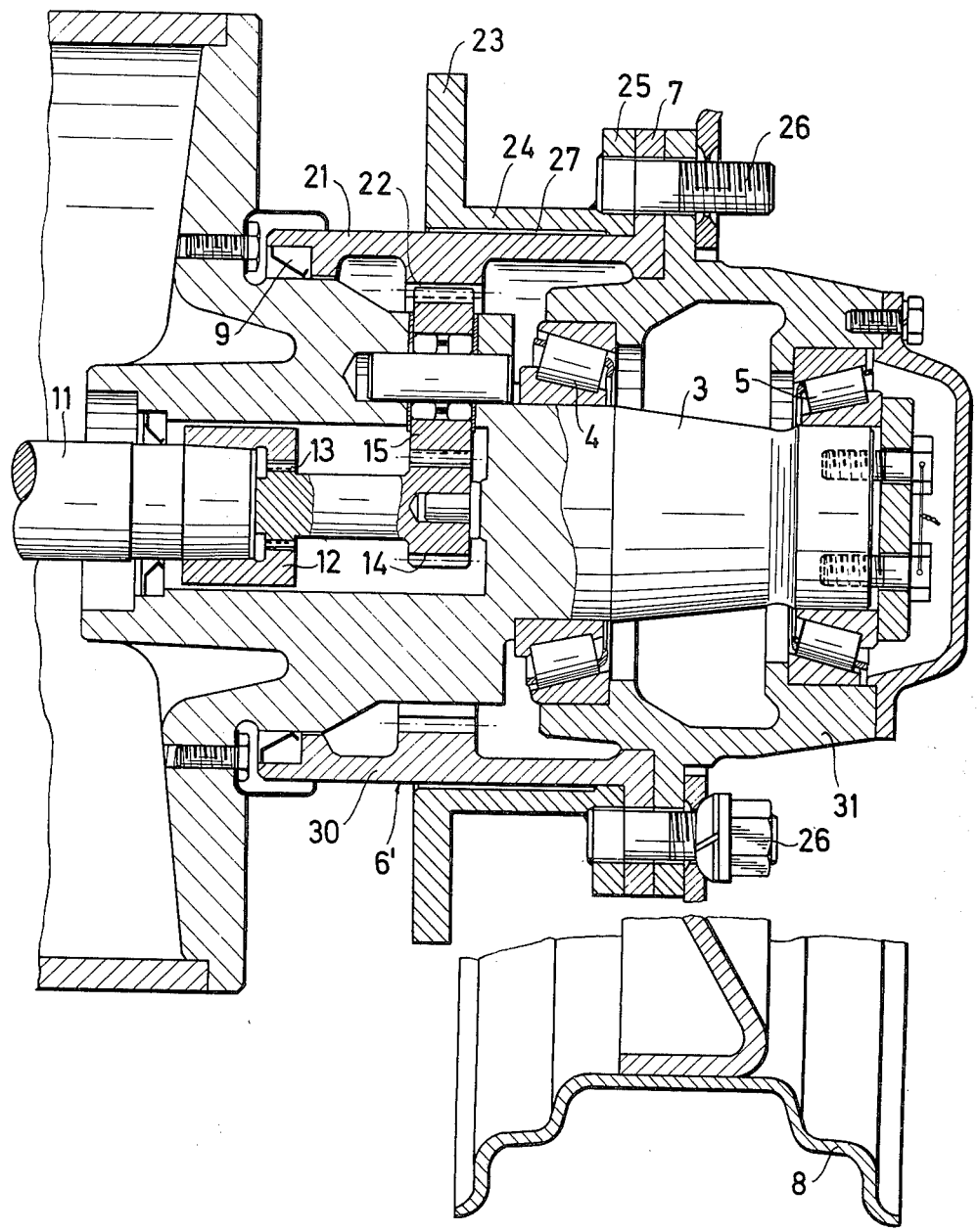
FIG. 2 illustrates an exemplary embodiment having a brake disk mounted thereon.

FIG. 2 illustrates a different exemplary embodiment in which the hub member 21 and the internal teeth 22 of the annular gear are made of one piece. The barke disk 23 is arranged at the end of a cylindrical sleeve 24 which is provided on the side remote from the brake disk with a flange 25 or the like. Said flange serves to center and secure the brake disk on the hub member for which purpose the screws 26 may be provided which also serve to secure the rim 8. The cylindrical sleeve 24 carrying the brake disk is dimensioned to provide a radial distance 27 between it and the hub member 21. In this manner the hub member and the teeth of the brake disk are independent of each other with respect to heat and resulting distortion. It is also possible to manufacture both parts of different materials chosen according to their respective functions.

Figure 3:
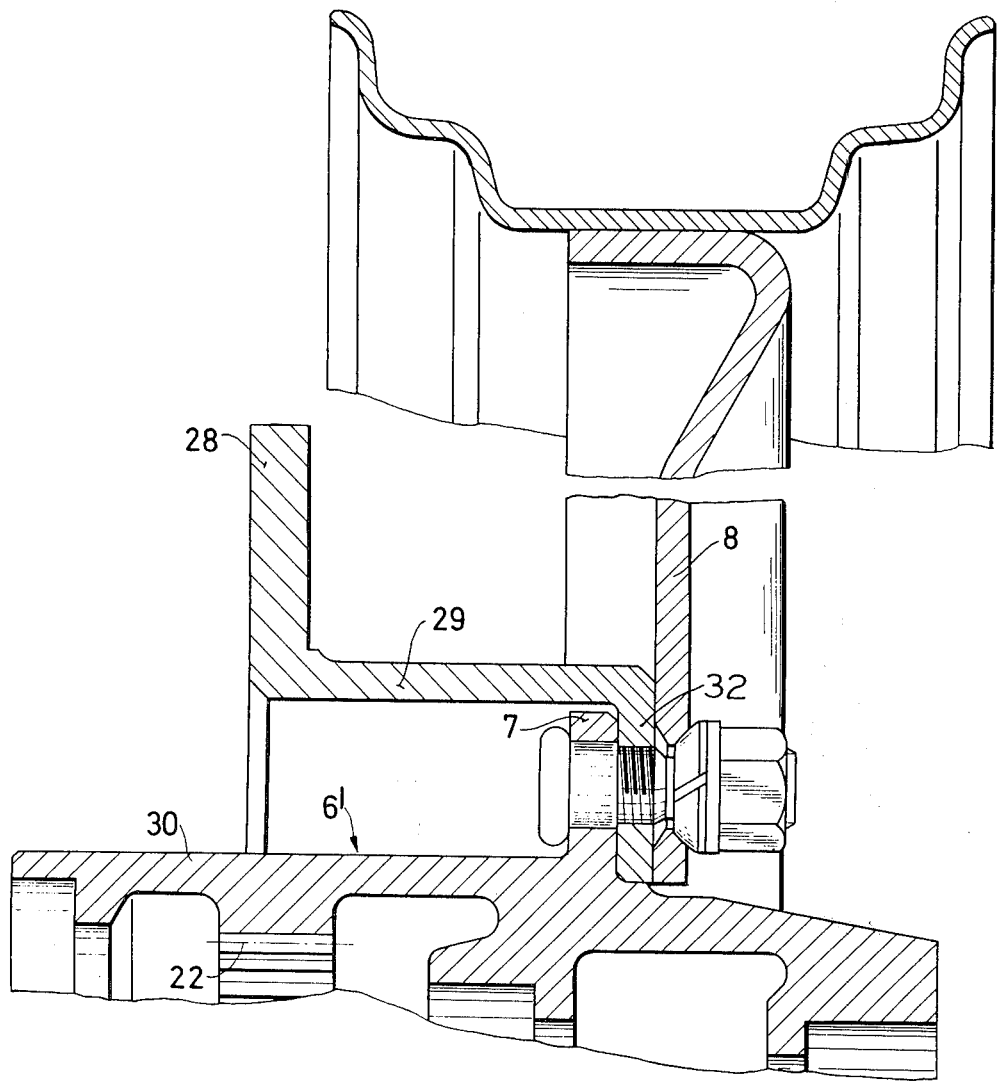
FIG. 3 illustrates a different embodiment of the example according to FIG. 2.

While in the exemplary embodiment according to FIG. 2, the flange of the brake disk is arranged, as seen from the rim, behind the flange 7 of the hub member 6', in the exemplary embodiment of FIG. 3 the brake disk 28 is so placed on a cylindrical part 29 that said cylindrical part surrounds the flange 7 of the hub member to cause the screw fastening of the flange 32 of the brake disk together with that of the rim 8 to be accomplished from the front on the hub member. This further simplifies the installation and replacement of the brake disk.

The embodiments of the illustrated examples can also be combined. Thus, for example, in the example according to FIG. 2, the hub member is composed of two parts, namely one cylindrical part 30, which is provided with the internal teeth 22, and a bearing holder 31 which carries the above-mentioned bearings with which the hub member is supported on the axle. In this embodiment each part of the hub can be manufactured of the material appropriate to its function.

Figure 4:
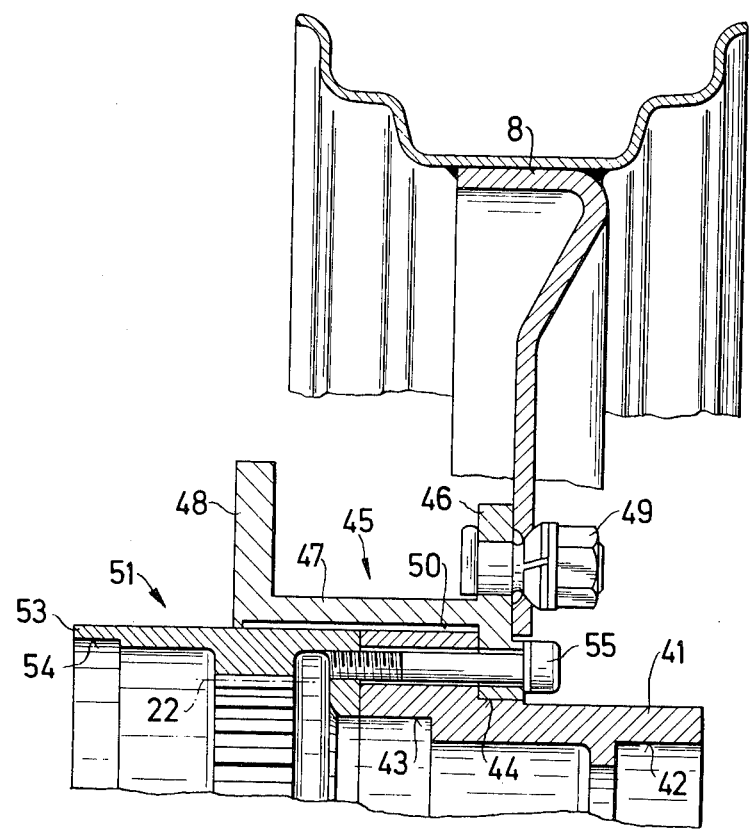
FIG. 4 illustrates a further exemplary embodiment of the invention.

In the exemplary embodiment shown in FIG. 4, similar to the exemplary embodiment shown in FIG. 2, the hub member is formed substantially of a bearing housing 41 which supports the bearing seats 42, 43 to receive the outer rings of the roller bearings (not illustrated in FIG. 4). The hub member is supported within the openings of the inner rings of these roller bearings on a nonrotating axle (not illustrated) which advantageously stops at a bearing plate or the like which is flanged on the drive motor for the wheel. The hub member receives on a centering surface 44 a brake disk 45 which consists substantially of a fastening flange 46, a cylindrical web 47 of any desired specific form and the actual brake disk 48. The flange 46 is made to fit the centering surface 44 and serves for mounting both the hub member 41 and the rim 8. For such mounting, there are utilized screws and nuts 49 in any conventional manner. The cylindrical, or otherwise, shaped web 47 surrounds the hub member with a radial clearance 50 which minimizes the transfer of heat and the resulting heat warpage from the brake disk to the hub member.

An annular gear 51 is secured on the inner front side of the bearing housing 41, which annular gear consists substantially of internal teeth 52 and a housing part 53. The housing part may be formed cylindrically or otherwise as desired. On the side remote from the bearing housing, the housing part is provided with an inner centering surface 54 for receiving a not-illustrated gasket which serves to seal the hub member or the housing part with respect to the above-mentioned axle. The not-illustrated intermediate gears or planet pinions mate with the internal teeth, which gears or pinions in turn engage a pinion which is keyed on the output shaft of the drive motor. To secure the annular gear on the bearing housing, screws 55 are provided. For the centering in a conventional manner, there may be provided, though not illustrated, pins or, differing from the exemplary embodiment, a center bore land on the anular gear and hub member.

The annular gear is advantageously manufactured of a material suitable for gears, while for the hub member and/or the brake disk the material is selected according to its function.

The illustrated exemplary embodiment can be varied within the scope of the invention. Thus it is possible, for example, to manufacture the annular gear and hub member of one piece. The important feature of the invention is that the rim 8 can be changed without affecting the relationships of the remaining parts.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A drive train for a vehicle having a frame member and a hub, said drive train comprising: drive motor means fixed to said frame member, and having a rotatable output shaft; planetary gear means drivingly connecting said output shaft to said hub, said planetary gear means comprising a sun gear secured to said output shaft, a planet gear secured to said frame member about a fixed rotation axis and in meshing engagement with said sun gear, and a first elongated hollow sleeve having an internal toothed ring gear in meshing engagement with said planet gear, and having first flange means for securement to said hub; a second elongated hollow sleeve in radially spaced relationship to said first sleeve forming a radial air space therebetween, said second sleeve having a disk brake means, and having second flange means for securement to said hub; said hub having third flange means, said first, second and third flange means being relatively coextensive and parallel; and fastener means for securing said first, second and third flange means together.

2. A drive train according to claim 1, wherein said first flange means is positioned between said second and third flange means.

3. A drive train according to claim 1, wherein said internal teeth are located intermediate the ends of said first sleeve from said first securement means and in radially aligned relation to said disk brake means.

4. A drive train according to claim 1, including means for securing a wheel to said hub means for rotation therewith.

5. A drive train according to claim 1, wherein said disk brake means includes flange means mounted on said second hollow sleeve.

6. A drive train according to claim 5, wherein said flange means includes a radially extending flange mounted in radial alignment with said ring gear.

7. A drive train according to claim 5, wherein said disk brake flange means includes a radially extending flange mounted on the free end of said second hollow sleeve and in radial alignment with said ring gear.

8. A drive train motor according to claim 1, wherein said ring gear is in generally radial alignment with said disk brake means.

* * * * *